United States Patent
Wu et al.

(10) Patent No.: US 12,282,736 B2
(45) Date of Patent: Apr. 22, 2025

(54) FRAMEWORK FOR MANAGING NATURAL LANGUAGE PROCESSING TOOLS

(71) Applicant: PAYPAL, INC., San Jose, CA (US)

(72) Inventors: Yuehao Wu, Cupertino, CA (US); Rajesh Munavalli, San Jose, CA (US); Junhua Zhao, Sunnyvale, CA (US); Xin Chen, Shanghai (CN); Meng Zang, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 656 days.

(21) Appl. No.: 17/361,073

(22) Filed: Jun. 28, 2021

(65) Prior Publication Data

US 2021/0342530 A1    Nov. 4, 2021

Related U.S. Application Data

(63) Continuation of application No. PCT/CN2019/130388, filed on Dec. 31, 2019.

(51) Int. Cl.
    *G06F 40/20*      (2020.01)
    *G06F 8/35*      (2018.01)
    *G06F 8/36*      (2018.01)

(52) U.S. Cl.
    CPC ............ *G06F 40/20* (2020.01); *G06F 8/35* (2013.01); *G06F 8/36* (2013.01)

(58) Field of Classification Search
    CPC ... G06F 40/20; G06F 8/35; G06F 8/36; G06F 40/30; G06F 40/263; G06F 40/284; G06F 40/289
    USPC .......................................................... 704/9
    See application file for complete search history.

(56) References Cited

U.S. PATENT DOCUMENTS

| | | | |
|---|---|---|---|
| 7,610,285 B1 | 10/2009 | Zoellner et al. | |
| 10,044,675 B1 * | 8/2018 | Ettema | H04L 63/0227 |
| 10,452,915 B1 * | 10/2019 | Chikkaveerappa | G06F 40/279 |
| 10,607,611 B1 * | 3/2020 | Shellef | G10L 15/01 |
| 10,762,301 B1 * | 9/2020 | Johnson | G06F 40/40 |
| 11,392,773 B1 * | 7/2022 | Gangadharaiah | G06F 40/242 |

(Continued)

FOREIGN PATENT DOCUMENTS

CN      109062901 A      12/2018

OTHER PUBLICATIONS

International Appl. No. PCT/CN2019/130388, International Search Report and Written Opinion mailed Sep. 29, 2020, 9 pages.

*Primary Examiner* — Thuykhanh Le
(74) *Attorney, Agent, or Firm* — HAYNES AND BOONE, LLP (57) ABSTRACT

A system performs operations that include receiving, via first computing environment, a request to process text data using a first natural language processing (NLP) model. The operations further include accessing configuration data associated with the NLP model, where the configuration data generated using a domain specific language that supports a plurality of preprocessing modules in a plurality of programming languages. The operations also include selecting, based on the configuration data, one or more preprocessing modules of the plurality of preprocessing modules, generating, based on the configuration data, a preprocessing pipeline using the one or more preprocessing modules, and generating preprocessed text data by inputting the text data into the preprocessing pipeline. The preprocessed text data is provided to the first NLP model.

20 Claims, 8 Drawing Sheets

(56) References Cited

U.S. PATENT DOCUMENTS

| | | | |
|---|---|---|---|
| 11,568,000 B2* | 1/2023 | Le | G06F 40/35 |
| 11,657,307 B1* | 5/2023 | Bodapati | G06N 20/00 |
| | | | 706/15 |
| 2006/0074924 A1* | 4/2006 | Tilei | G10L 15/063 |
| 2009/0210218 A1* | 8/2009 | Collobert | G06F 40/284 |
| | | | 704/9 |
| 2010/0216493 A1 | 8/2010 | Narayanan et al. | |
| 2011/0069822 A1* | 3/2011 | Jan | G06F 40/30 |
| | | | 379/88.04 |
| 2011/0264705 A1* | 10/2011 | Diamond | G11B 27/034 |
| | | | 715/730 |
| 2012/0233207 A1* | 9/2012 | Mohajer | G06F 16/3334 |
| | | | 707/769 |
| 2013/0122482 A1* | 5/2013 | Sukkarieh | G09B 7/02 |
| | | | 434/353 |
| 2013/0159340 A1* | 6/2013 | Blanco | G06F 16/9538 |
| | | | 707/769 |
| 2014/0006013 A1* | 1/2014 | Markatou | G16H 50/70 |
| | | | 704/9 |
| 2014/0177948 A1* | 6/2014 | Deolalikar | G06F 16/285 |
| | | | 382/159 |
| 2015/0032442 A1* | 1/2015 | Marcus | G06F 40/211 |
| | | | 704/9 |
| 2015/0227579 A1* | 8/2015 | Cantarero | G06F 16/313 |
| | | | 707/708 |
| 2015/0227845 A1* | 8/2015 | Hakkani-Tur | G06N 5/00 |
| | | | 706/52 |
| 2016/0012020 A1* | 1/2016 | George | G06F 40/30 |
| | | | 704/9 |
| 2016/0078087 A1* | 3/2016 | Wang | G06F 16/24575 |
| | | | 707/706 |
| 2016/0132940 A1* | 5/2016 | Frommann | G06Q 30/0276 |
| | | | 705/14.48 |
| 2016/0210551 A1* | 7/2016 | Lee | G10L 15/16 |
| 2017/0104785 A1* | 4/2017 | Stolfo | H04L 63/1491 |
| 2017/0154108 A1* | 6/2017 | Kraus | G06F 16/367 |
| 2018/0012110 A1* | 1/2018 | Souche | G06V 10/454 |
| 2018/0121413 A1* | 5/2018 | Warren | G06F 40/295 |
| 2018/0218066 A1* | 8/2018 | Krishnan | G06F 16/3334 |
| 2018/0225259 A1* | 8/2018 | Alba | G06F 40/237 |
| 2018/0268298 A1* | 9/2018 | Johansen | G06V 10/82 |
| 2018/0316571 A1* | 11/2018 | Andrade | G06Q 10/101 |
| 2018/0349359 A1* | 12/2018 | McCann | G06N 3/08 |
| 2018/0349754 A1* | 12/2018 | Kumar | H04L 51/02 |
| 2019/0042290 A1* | 2/2019 | Bailey | G06F 9/5077 |
| 2019/0129732 A1* | 5/2019 | Sivertson | G06N 7/01 |
| 2019/0228099 A1 | 7/2019 | Bajaj et al. | |
| 2019/0259470 A1* | 8/2019 | Olafson | G16B 50/10 |
| 2019/0294960 A1* | 9/2019 | Niemi | G06N 3/08 |
| 2019/0332619 A1* | 10/2019 | De Sousa Webber | G06F 21/564 |
| 2019/0332664 A1* | 10/2019 | O'Neill | G06F 40/289 |
| 2019/0361977 A1* | 11/2019 | Crudele | G06F 40/284 |
| 2020/0012719 A1* | 1/2020 | Mass | G06F 40/295 |
| 2020/0050638 A1* | 2/2020 | Hancock | G06F 16/90344 |
| 2020/0050856 A1* | 2/2020 | Chikkaveerappa | G06V 20/20 |
| 2020/0151252 A1* | 5/2020 | Guo | G06F 40/30 |
| 2020/0167134 A1* | 5/2020 | Dey | G06F 8/65 |
| 2020/0184016 A1* | 6/2020 | Roller | G06N 3/08 |
| 2020/0379787 A1* | 12/2020 | Martin | G06F 16/176 |
| 2020/0380389 A1* | 12/2020 | Eldeeb | G06F 16/285 |
| 2020/0388271 A1* | 12/2020 | Dunn | G10L 15/26 |
| 2021/0019374 A1* | 1/2021 | Donaldson | G06N 3/045 |
| 2021/0081293 A1* | 3/2021 | Sahni | G06Q 30/01 |
| 2021/0081819 A1* | 3/2021 | Polleri | G06N 5/022 |
| 2021/0082400 A1* | 3/2021 | Vishnoi | G06F 40/30 |
| 2021/0097096 A1* | 4/2021 | Osmon | G06F 40/284 |
| 2021/0103458 A1* | 4/2021 | Manousakis | G06F 9/45558 |
| 2021/0117819 A1* | 4/2021 | Rao | G06F 16/904 |
| 2021/0125190 A1* | 4/2021 | Coman | G06Q 30/016 |
| 2021/0125329 A1* | 4/2021 | Zachmann | G06N 5/04 |
| 2021/0141815 A1* | 5/2021 | Kochura | G06F 40/166 |
| 2021/0283498 A1* | 9/2021 | Zhang | G06F 9/547 |
| 2022/0129641 A1* | 4/2022 | Jezewski | G06F 40/284 |
| 2022/0129766 A1* | 4/2022 | Potts | G16H 70/60 |
| 2022/0215184 A1* | 7/2022 | Freitag | G06F 40/226 |
| 2022/0319233 A1* | 10/2022 | Wu | G06V 10/454 |
| 2022/0414349 A1* | 12/2022 | Rathnam | G06F 40/58 |
| 2023/0237028 A1* | 7/2023 | Sweeney | G06N 5/025 |
| | | | 706/11 |
| 2023/0297780 A1* | 9/2023 | Raj | G06F 40/284 |
| | | | 704/9 |

* cited by examiner

FRAMEWORK FOR MANAGING NATURAL LANGUAGE PROCESSING TOOLS

CROSS-REFERENCE TO RELATED APPLICATION

This application claims priority to Chinese PCT Application No. PCT/CN2019/130388, filed Dec. 31, 2019, which is incorporated herein by reference in its entirety.

BACKGROUND

Technical Field

This disclosure relates generally to natural language processing and, more specifically, to a framework for managing natural language processing tools.

Description of the Related Art

Natural language processing (NLP) has become prevalent with the ubiquity of smart devices and digital voice assistants. Numerous NLP models are being constantly built, tested, deployed, and refined. Typically, in order to for an NLP model to process a give text data, the text data is preprocessed using various methods to transform the text data into a format that is recognizable by the NLP model. The preprocessed text data can then be input into the NLP model, which can produce an output, such as a classification of the text data.

In many organizations, data scientists build and train NLP models in an offline computing environment. The data scientists can choose among various NLP software toolkits exist to build NLP models. As such, NLP models can be built based on different programming languages and libraries. Once an NLP model is complete, the data scientist provides the NLP model to a production engineer, who rewrites code for the NLP model to be operable in an online computing environment. This process can be time intensive and may be prone to errors, as the production engineer performs the code translation for the various toolkits, libraries, and programming languages used by the data scientists.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "model processing module" "configured to run and/or execute the RNN fraud model" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for implementing a framework for managing natural language processing tools. A service provider system maintained by a service provider is configured to deploy natural language processing (NLP) models to classify text data. The service provider system may include multiple computing environments including an offline computing environment and an online computing environment.

In typical implementations, a user in the offline computing environment, such as a data scientist, may wish to generate an NLP model. Various NLP software toolkits, libraries, and other software modules in various programming languages exist to facilitate the building of NLP models. As such, the data scientist may select a particular toolkit and/or set of libraries to use in order to build a preprocessing pipeline that includes one or more preprocessing modules. The modules in the preprocessing pipeline may collectively preprocess text data into a form that is useable by the NLP model. Different data scientists in the offline environment may select different toolkits and libraries to implement the preprocessing pipeline. Once the NLP model is trained using the preprocessing pipeline built by the data scientist, the model and preprocessing code corresponding to the preprocessing pipeline are provided to a production engineer in the online computing environment.

The online computing environment is configured to run "live" software modules in production. Typically, the code used to run modules in the online computing environment is written in a different programming language than that of the preprocessing code used to implement the preprocessing pipeline. Therefore, the production engineer may be required to translate the preprocessing code into the programming language used by the online computing environment. That is, the code used in the offline computing environment to invoke and/or call the selected NLP libraries and toolkits may need to be translated to code in a different programming language in the online computing environment. Such translation may include validating various variables, functions, and/other modules between the preprocessing code and the translated code in the online computing environment to ensure that the selected NLP libraries and toolkits are correctly invoked. This validation can be time consuming and difficult to troubleshoot when errors arise.

Therefore, according to certain embodiments, the service provider system enables a first user (e.g., such as a data scientist) in the offline computing environment to describe a preprocessing pipeline for an NLP model using a domain specific language (DSL) provided by the service provider system. The DSL provides a uniform way to describe and designate the specific NLP software toolkits, libraries, and programming languages that may be used to generate the preprocessing pipeline. For example, the service provider system includes a DSL module that generates configuration data based on input from the first user. The configuration data indicates a selection of one or more preprocessing module types as wells as the associated software toolkits and libraries to implement them. The configuration data further indicates a sequence in which the preprocessing modules are to be executed to preprocess text data. The configuration data thus describes the preprocessing pipeline for the NLP model.

The NLP model is trained in the offline computing environment by a training module included in the service provider system. For instance, the training module is provided training data, such as from a computer of the first user. The training data may include sample text data whose classification is known. The training module provides the training data and the configuration data for the NLP model to a DSL processing module.

As such, the service provider system also includes the DSL processing module, which generates preprocessed data from text data in format and/or format that can be input into the NLP model. To this end, the DSL processing module is configured to generate preprocessed data from the training data by inputting the training data into the preprocessing modules included in the preprocessing pipeline that is defined by the configuration data. The resulting preprocessed data is provided to the training module, which completes training by iteratively inputting the preprocessed data into the NLP model and compare the resulting outputs of the NLP model with the known classifications of the training data. At the completion of training, the training module produces the NLP model having a corresponding set of model weights.

The trained NLP model is then validated in an online computing environment. The online computing environment may differ from the offline computing environment in several respects. For example, the online computing environment may include different computer hardware than the offline computing environment. The online computing environment may have access to different data and different data systems than the offline computing environment. Further, the operating systems, libraries, and/or other software used in the online computing environment may be different and/or may be of different versions than those of the offline computing environment. It will be appreciated that the above listed differences are merely examples and not exhaustive, and that various other differences are possible between the online computing environment and the offline computing environment.

However, both the online computing environment and the offline computing environment may have access to the same DSL processing module, thereby enabling efficient validation of the NLP model in the online environment despite its differences with the offline computing environment. For instance, the configuration data corresponding to the NLP model may be provided to a validation module. Additionally, sample data may be provided to validation module. The output resulting from inputting the sample data into the preprocessing pipeline may already be known and/or the NLP model, such as based on testing in the offline environment. As such, the validation module may validate the preprocessing pipeline by providing the sample data and the configuration data to the DSL processing module and comparing the output of the DSL processing module with the expected output of the sample data.

In view of the above, the service provider system enables the preprocessing pipeline to be validated between the offline computing environment and the offline computing environment without having to translate code between the two computing environments.

Figure 1:
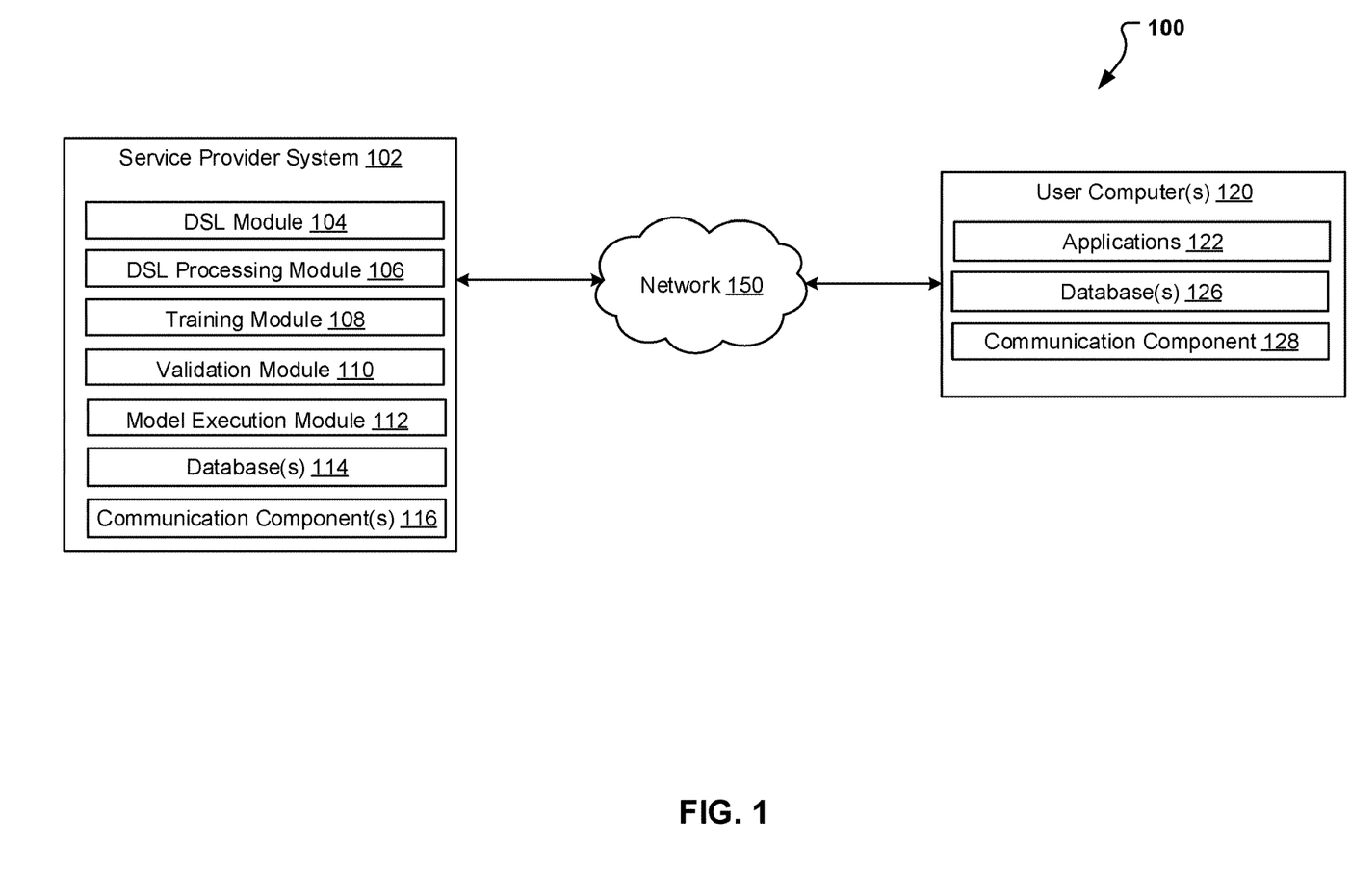
FIG. 1 is a block diagram illustrating an example system for implementing a framework for managing natural language processing tools, according to some embodiments.

FIG. 1 is a block diagram illustrating an example system 100 for a framework for managing natural language processing tools. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a domain specific language (DSL) module 104, a DSL processing module 106, a training module 108, a validation module 110, a model execution module 112, database(s) 114, and communication components 116. Each of the components of the service provider system 102 may communicate with each other to implement the framework for managing natural language processing tools, as will be described in more detail below.

Figure 3:
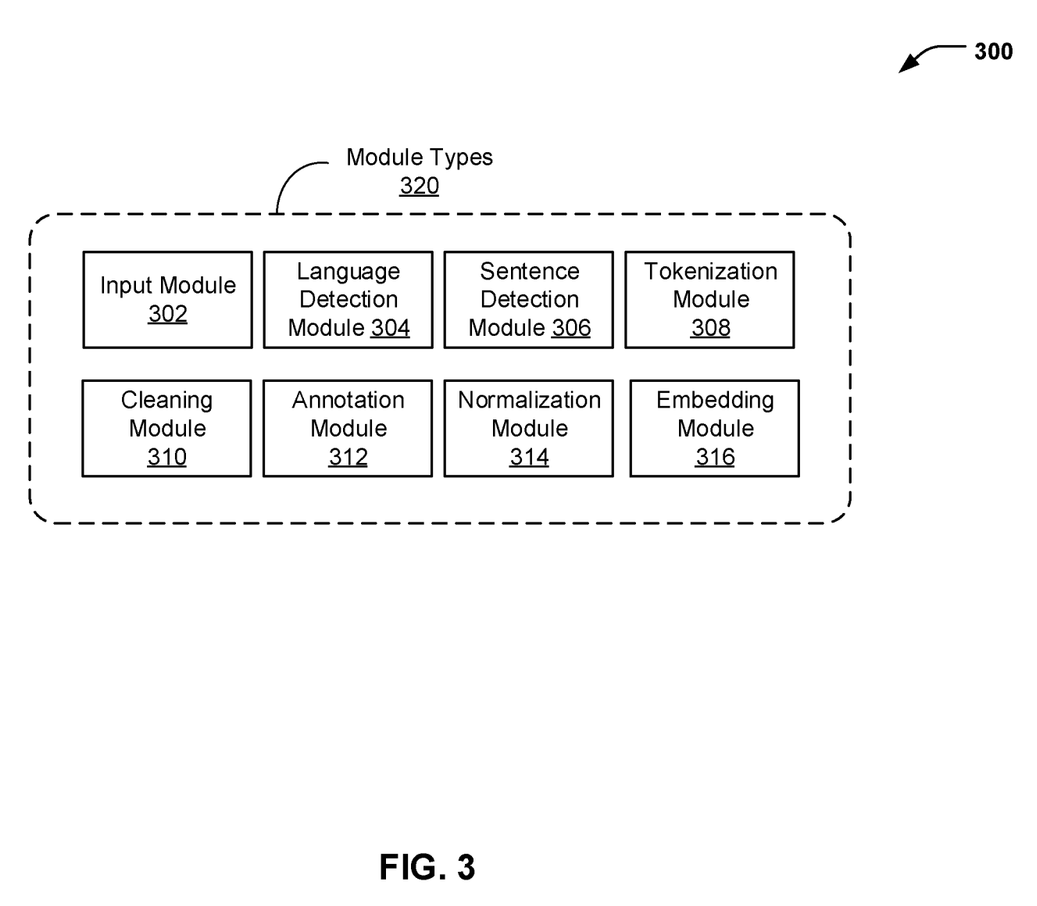
FIG. 3 illustrates an example set of preprocessing module types that can be used to form a preprocessing pipeline, according to some embodiments.
Figure 4:
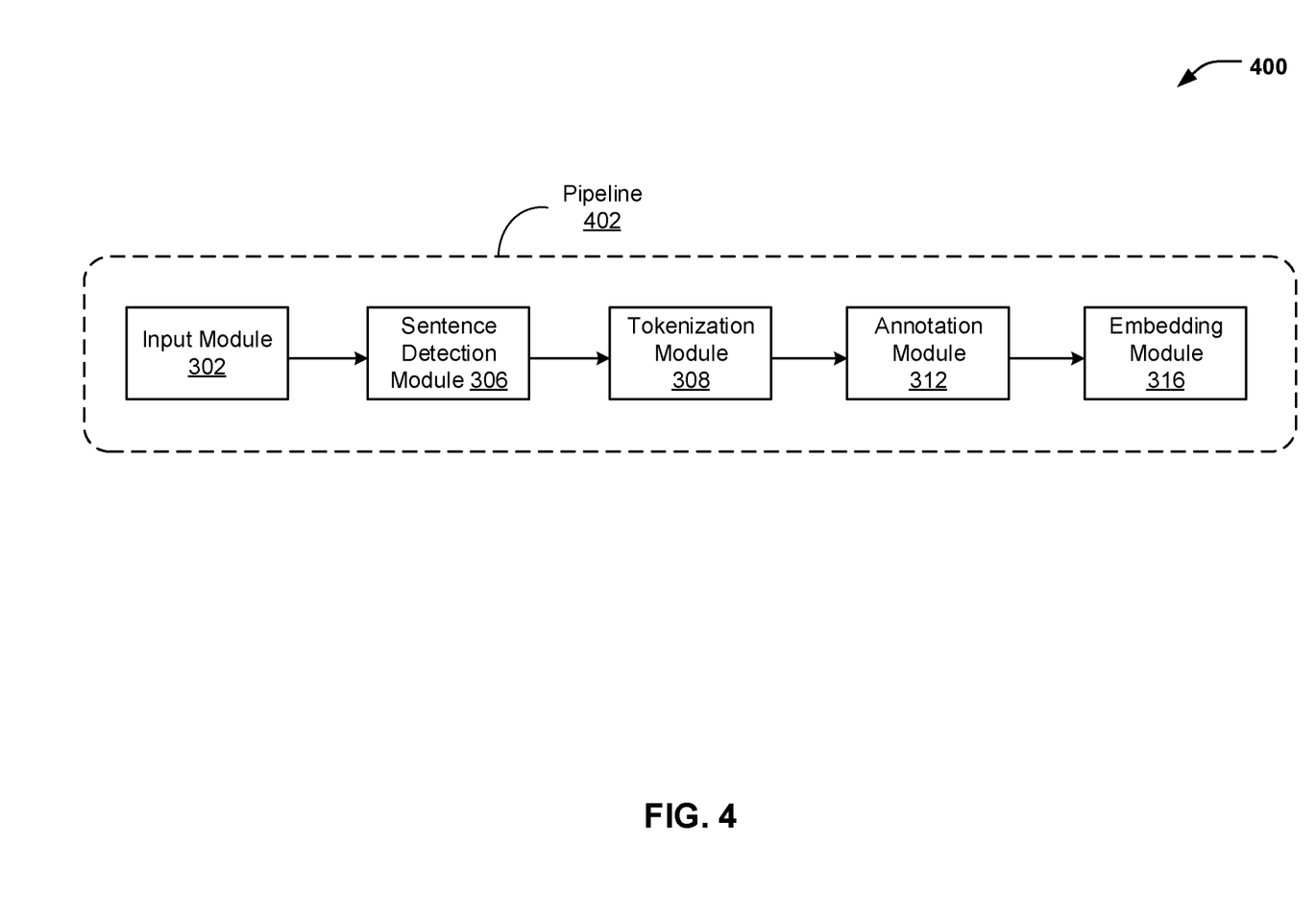
FIG. 4 is a diagram illustrating an example preprocessing pipeline, according to some embodiments.

The DSL module 104 is configured to generate configuration data for an NLP model written in the DSL. The configuration data defines a preprocessing pipeline for the NLP model. As such, the preprocessing pipeline includes one or more preprocessing modules in a particular sequence, such that text data is sequentially processed by each of the preprocessing modules. For example, FIG. 3 illustrates an example set of preprocessing module types 320 that can be used to form a preprocessing pipeline. FIG. 4 illustrates an example of a preprocessing pipeline 402 that can be formed from a subset of the module types 320. Additionally, each of the module types 320 can be implemented using various NLP toolkits and libraries in multiple different programming languages. FIG. 3 and FIG. 4 are described in more detail in conjunction with the description of FIG. 2.

Thus, the configuration data may indicate a selection of a set of preprocessing modules to be included in the preprocessing pipeline. The configuration data may further indicate the particular NLP toolkits, libraries, software packages and/or the like that are to be used in implementing (e.g., coding) the preprocessing modules. Additionally, the configuration defines the sequence of the preprocessing modules in the preprocessing pipeline.

The DSL processing module 106 is configured to execute the preprocessing pipeline defined by the configuration data. For instance, the DSL processing module 106 receives text data that is to be preprocessed and inputs the text data into the preprocessing pipeline. The DSL processing module 106 generates preprocessed text data as a result.

The training module 108 is configured to train an NLP model given model architecture information for the NLP model, a preprocessing pipeline, and training data. The training module 108 preprocesses the training data via the DSL processing module 106 and iteratively trains the NLP model using the preprocessed training data. The training module 108 outputs a trained NLP model once training is completed.

The validation module 110 is configured to validate the preprocessing pipeline in a different computing environment in which it was generated. For instance, the preprocessing pipeline may have been generated a first computing environment (e.g., an offline computing environment) and the validation module 110 may validate the preprocessing pipeline in a second computing environment (e.g., an online computing environment). To this end, the validation module 110 ensures that the results produced by the preprocessing pipeline are consistent between the first computing environment and the second computing environment.

The model execution module 112 is configured to execute the NLP model in real-time, such as in an online and/or production environment that is receiving actual data from user computers and applications, such as user computer(s) 120 and applications 122. The model execution module 112 preprocesses incoming text data using the preprocessing pipeline defined by the configuration data associated with the NLP model. The resulting preprocessed data is then input into the NLP model, and the model execution module 112 generates an output based on execution of the NLP model.

The database(s) 114 stores various information that may include, for example, identifiers (IDs) such as operating system registry entries, cookies, IDs associated with hardware of the communication component 116, IDs used for payment/user/device authentication or identification, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to facilitate payment transactions and other financial transactions.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2A:
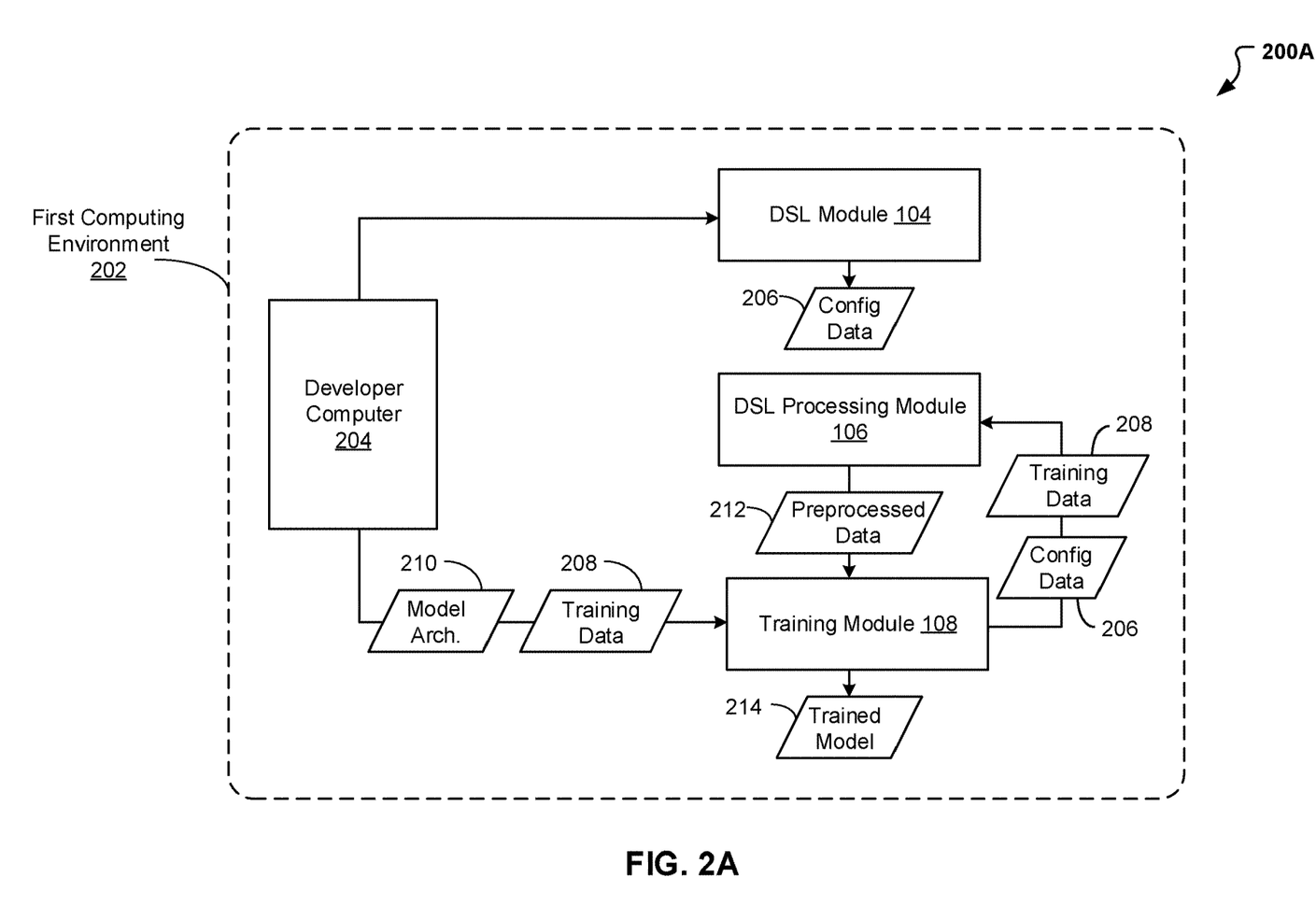
FIG. 2A is a diagram illustrating a data flow for generating a model via using the framework for managing natural language processing tools, according to some embodiments.

FIG. 2A illustrates a data flow diagram 200A for generating an NLP model in accordance with a particular embodiment. Portions of FIG. 2 are described in conjunction with FIG. 3 and FIG. 4. As shown in FIG. 2, a developer (e.g., data scientist) computer 204 is in communication with the DSL module 104 and the training module 108 of the service provider system 102. As illustrated, the developer computer 204, the DSL module 104, and DSL processing module 106, and the training module 108 operate in a first computing environment 202. According to a particular embodiment, the first computing environment 202 is an offline computing environment used for testing and training machine learning models. The offline computing environment may not operate on "live" data received from user computer(s) 120.

The developer computer 204 may generate configuration data 206 via the DSL module 104. The configuration data 206 may describe a preprocessing pipeline that includes one or more preprocessing modules. For example, FIG. 3 illustrates a set of preprocessing module types 320 from which one or more modules may be selected to be included in the preprocessing pipeline. The module types 320 may include an input module 302, a language detection module 304, a sentence detection module 306, a tokenization module 308, a cleaning module 310, an annotation module 312, a normalization module 314, and an embedding module 316. As previously discussed, the module type 320 may be implemented using various NLP toolkits, libraries, packages, and/or the like in different programming languages.

According to certain embodiments, the input module 302 may be configured to receive input text data, such as from an email, text message, instant message, and/or any other source. The language detection module 304 may be configured to determine the language of the input text data. The sentence detection module 306 may be configured to identify one or more sentences within the input text data, such as via punctuation and/or any other means. The tokenization module 308 may be configured to generate one or more tokens from the input text data (e.g., word, characters, etc.). The cleaning module 310 may be configured to filter out one or more of the tokens generated by the tokenization module 308. The annotation module 312 may be configured to label/categorize the input text data (e.g., the tokens) into different categories. The normalization module 314 may be configured to normalize the input text data (e.g., the tokens) into values in a desired value range (e.g., according to a normalization function). The embedding module 316 may be configured to convert the tokens into a format that is useable by the NLP model. In certain implementations, the embedding module 316 converts the tokens into a matrix of floating point numbers.

In certain embodiments, the preprocessing pipeline corresponding to the configuration data 206 is depicted by the preprocess pipeline 402 in FIG. 4. As such, the preprocessing pipeline 402 may include the input module 302, the sentence detection module 306, the tokenization module 308, the annotation module 312, and the embedding module 316 in the order illustrated. To this end, the output of each module is provided as input to the next successive module in the sequence. In certain implementations, each module in the preprocessing pipeline 402 is coded using the same NLP toolkit.

Referring back to FIG. 2A, the developer computer 204 may also provide a model architecture 210 of the NLP model and training data 208 to the training module 108. The training module 108 may also be configured to access the configuration data 206 generated for the NLP model. The training module 108 further provides the configuration data 206 and the training data 208 to the DSL processing module 106. As such, the DSL processing module 106 is configured to execute, using the training data 208 as input, the input module 302, sentence detection module 306, the tokenization module 308, the annotation module 312, and the embedding module 316 of the preprocessing pipeline 402. Executing the preprocessing pipeline 402 produces preprocessed data 212 from the training data 208.

According to certain embodiments, the entire set of training data 208 is preprocessed by the DSL processing module 106 at once. The training module 108 then trains the model using the preprocessed training data. In other embodiments, each discrete unit of the training data (e.g., a sentence) is preprocessed one at a time by the DSL processing module 106 and then successively used to train the model. The training module 108 outputs a trained NLP model 214 after completing the training process. The trained NLP model 214 is then provided to a second computing environment (e.g., an online environment) where the trained NLP model can be used to classify input text data received by external applications.

Figure 2B:
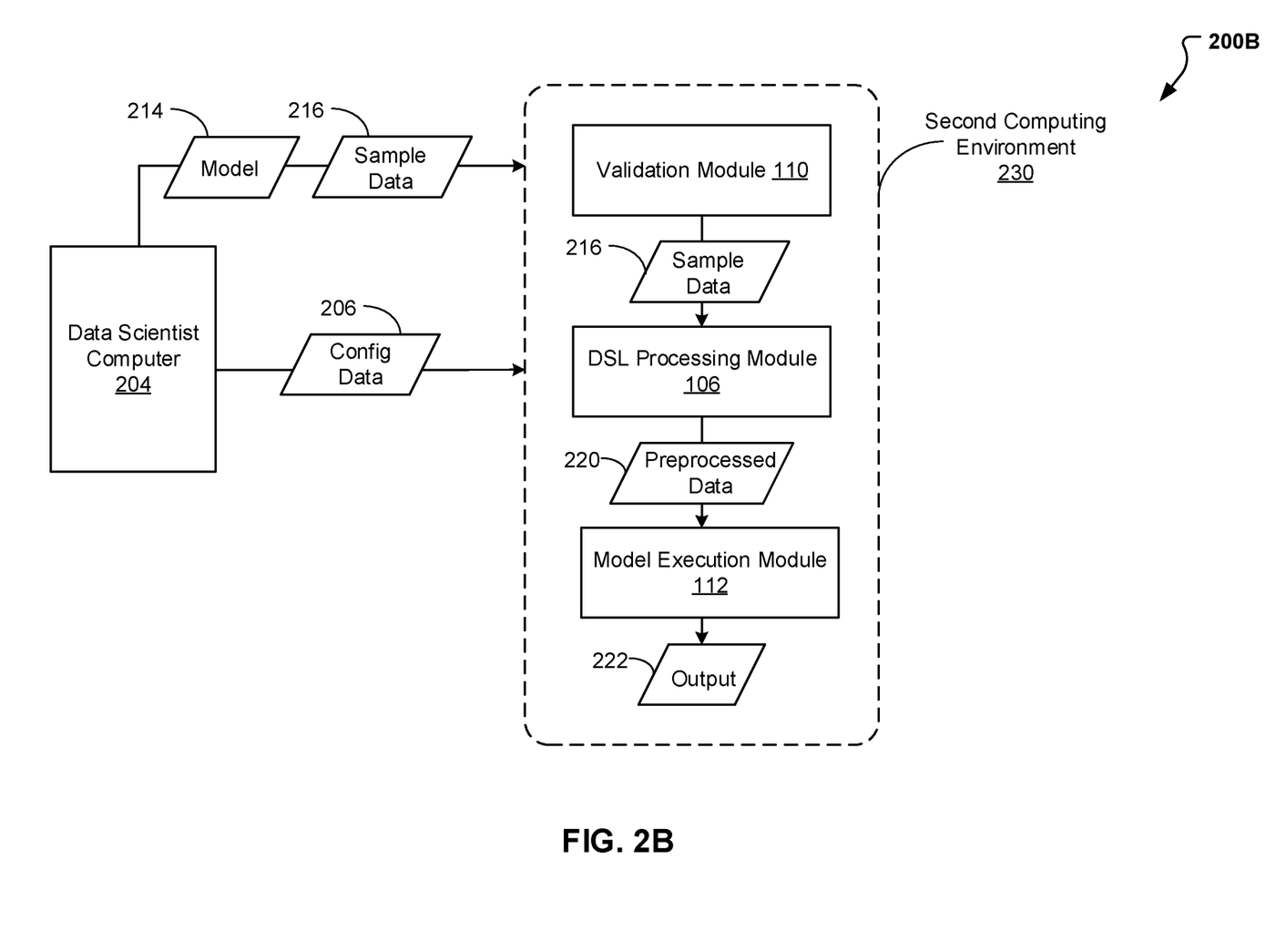
FIG. 2B is a diagram illustrating a data flow for building and training a model using the framework for managing natural language processing tools, according to some embodiments.

FIG. 2B shows a diagram 200B illustrating the operation of the second computing environment 230 with respect to the service provider system 102. As shown in FIG. 2B, the data scientist computer 204 provides the trained model 214 and sample data 216 to the second computing environment 230. According to a particular embodiment, the second computing environment is an online computing environment that receives and/or processes real-time information from external sources, such as user computers 120 and user applications 122. As such, trained models (e.g., trained NLP model 214) are executed in the online computer environment to make certain determinations and/or predictions based on the real-time information.

Further, the online computing environment may have various differences with an offline computing environment (e.g., the first computing environment 202). For example, the online computing environment may include different computer hardware than the offline computing environment, such as different servers, networking equipment, database systems, computers, security systems, and/or the like. The online computing environment may have access to different data and different data systems than the offline computing environment. Further, the operating systems, libraries, security protocols, programming languages, and/or other software used in the online computing environment may be different and/or may be of different versions than those of the offline computing environment. It will be appreciated that the above listed differences are merely examples and not exhaustive, and that various other differences are possible between the online computing environment and the offline computing environment.

Thus, as previously discussed, validating the trained NLP model 214 in the online computing environment to ensure that the trained NLP model 214 functions as it does in the offline computing environment is typically time intensive and may be prone to errors. According to a particular embodiment, the second computing environment 230 includes the validation module 110 of the service provider system 102. The validation module 110 validates preprocessing pipeline of the trained NLP model 214 by providing the configuration data 206 and the sample data 2165 to the DSL processing module 106. Since the DSL processing module 106 is used by both the first computing environment 202 and the second computing environment 230, the preprocessing pipeline can be validated without any code translation.

To the end, the DSL processing module 106 generates preprocessed data 220 from the sample data 216 and configuration data 206. The sample data 216 includes text data in which the output of executing the trained NLP model 214 using the text data is already known. As such, the preprocessed (sample) data 202 is input to the model execution module 112, which executes the trained NLP model 214 using the preprocessed (sample) data 202. The validation module 110 is configured to compare the output 222 of the model execution module 112 with the known/expected outputs of the sample data 216. In certain embodiments, if the validation module 110 identifies any errors (e.g., one or more of the outputs 222 doesn't match the output of the sample data 216), the validation module 110 provides the preprocessed (sample) data 220 for debugging purposes.

Figure 2C:
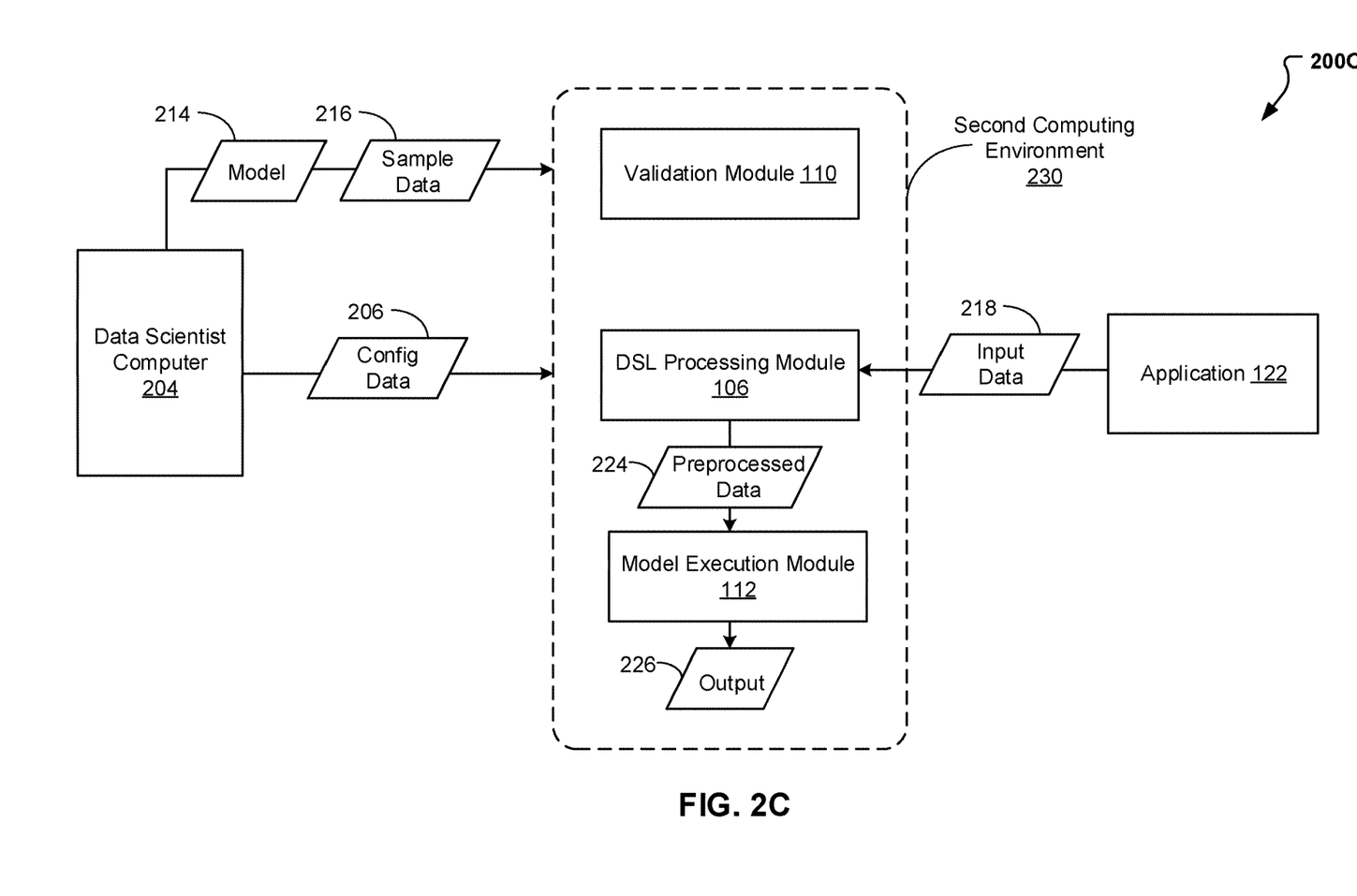
FIG. 2C is a diagram illustrating a data flow for executing a model using the framework for managing natural language processing tools, according to some embodiments.

FIG. 2C illustrates a diagram 200C depicting an execution of the trained NLP model 214 in the second computing environment 230 in real-time, in accordance with one or more embodiments. As shown in FIG. 2C, the second computing environment 230 still has access to the trained NLP model 114 and its corresponding configuration data 206 that was provided by the data scientist computer 204. An external application, such as application 122 transmits input text data 218 to the service provider system 102. The input text data may be any type of text data for any source including, but not limited to, emails, text messages, chatbots, instant messages, social media comments and posts, metadata, ecommerce transactions, voice-to-text translations, and websites.

The DSL processing module 106 generates preprocessed (input text) data 224 based on the configuration data 206. The preprocessed data 224 is input into the model execution module 112, which executes the trained NLP model 214 based on the preprocessed data 224. As a result, an output 226 of executing the NLP model 214 is generated.

Figure 5:
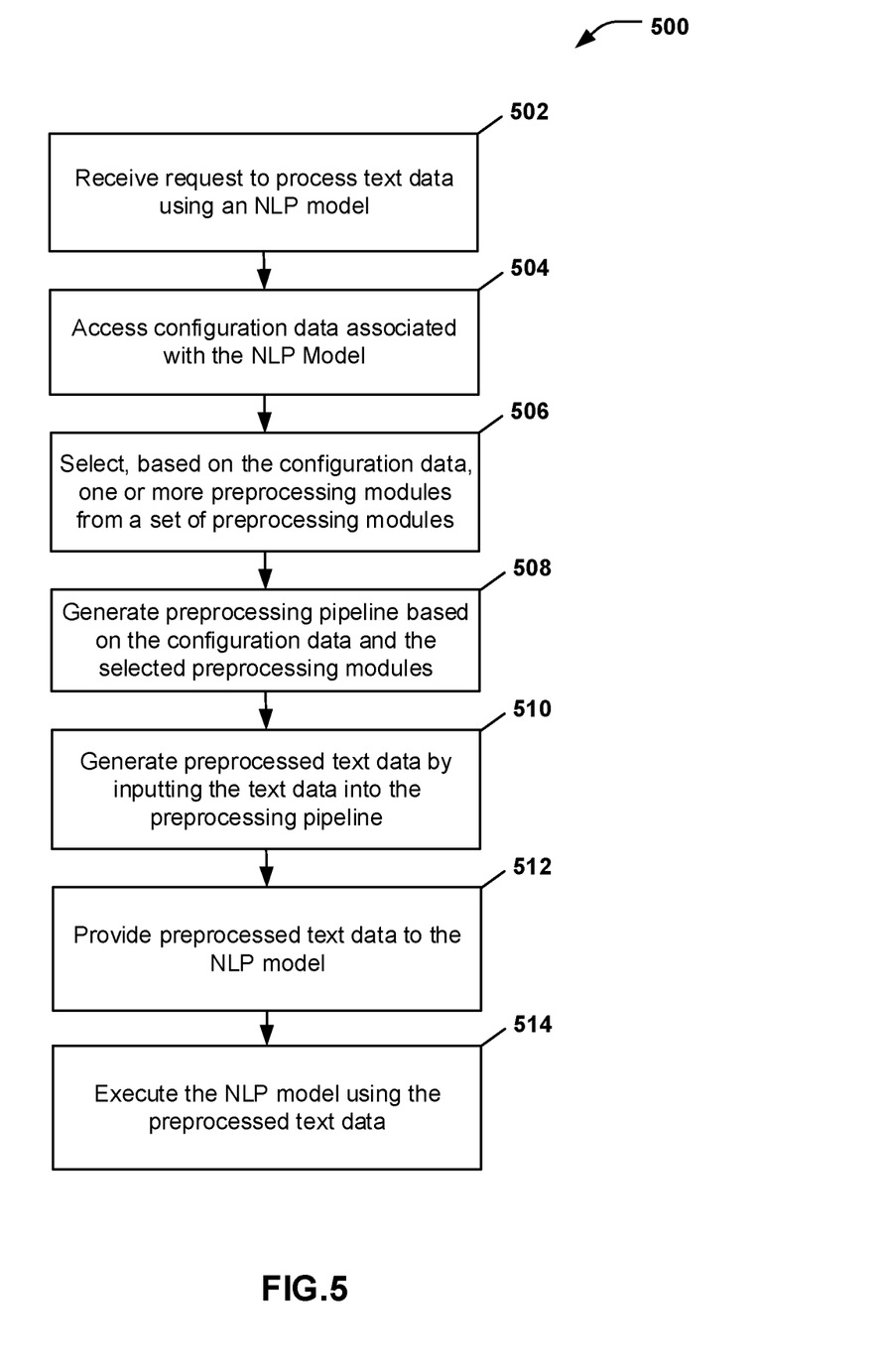
FIG. 5 illustrates a flow diagram illustrating a method for generating and executing a NLP model using the framework for managing natural language processing tools, according to some embodiments.

FIG. 5 illustrates an example flow diagram of a method 500 for a framework for managing natural language processing tools. The method 500 begins at step 502, where a service provider system (e.g., service provider system 102) receives a request to process text data using an NLP model. At step 504, the service provider system may access configuration data associated with the NLP model. As such, the configuration data may be generated using a DSL language that enables a selection of various NLP preprocessing modules from different NLP toolkits, libraries, and/or software packages in one or more programming languages.

At step 506, the service provider system may select, based on the configuration data, one or more preprocessing modules from a set of preprocessing modules that may be provided by the different NLP toolkits, libraries, and/or software packages previously mentioned. At step 508, the service provider system may generate a preprocessing pipeline based on the selected preprocessing modules indicated by the configuration data. At step 510, the service provider system generates preprocess text data by inputting the text data into the preprocessing pipeline. At step 512, the preprocessed text data is provided to the NLP model, which is executed at step 514 using the preprocessed text data.

Example Computing Device

Figure 6:
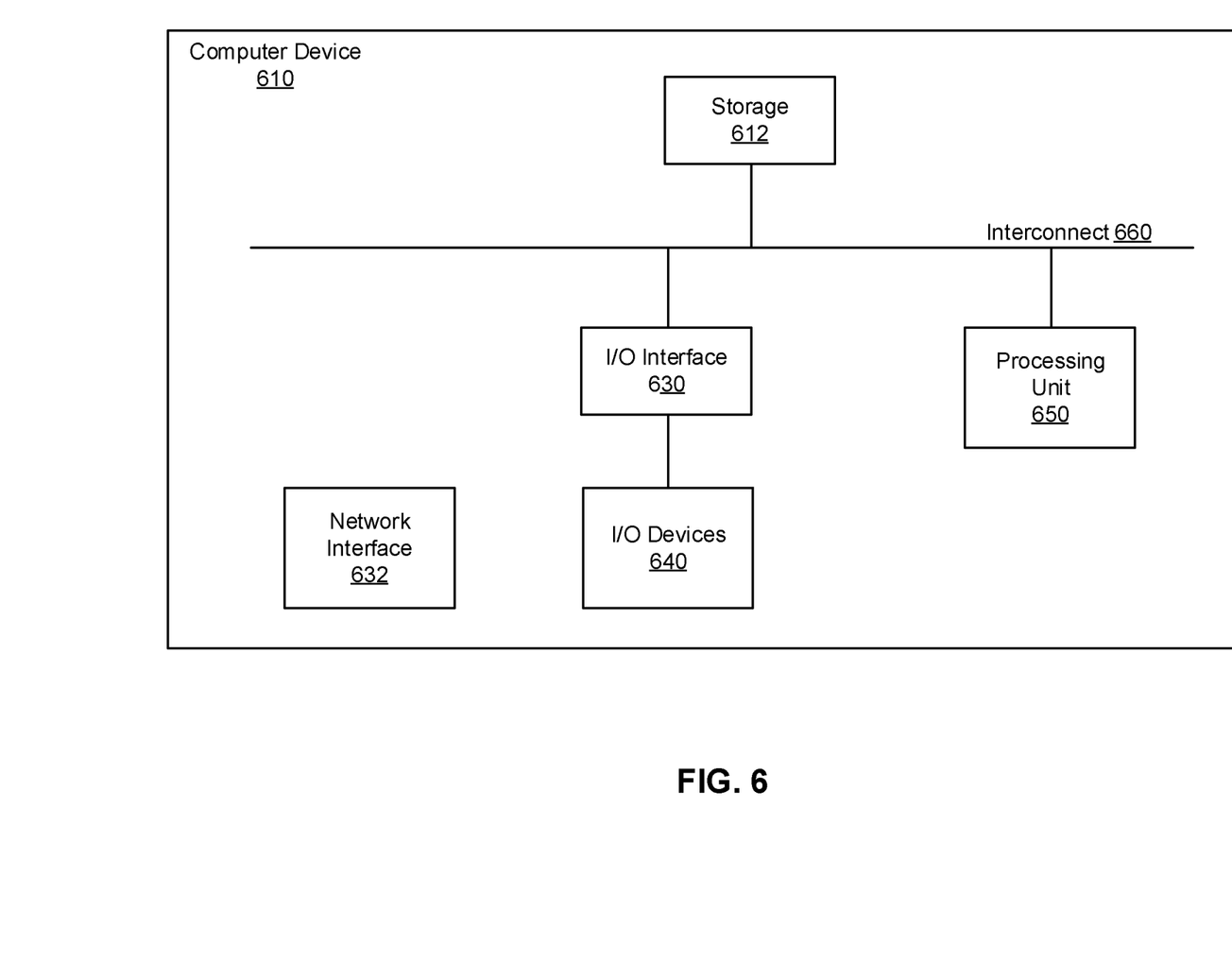
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including any of the components illustrated in FIG. 1 and FIG. 2A-C. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
one or more hardware processors; and
a memory storing computer-executable instructions, that in response to execution by the one or more hardware processors, causes the system to perform operations comprising:
generating, in an offline computing environment and using a domain specific language that provides a uniform way to designate a plurality of computer programming languages usable to create preprocessing modules, first model configuration data associated with a first natural language processing (NLP) model and second model configuration data associated with a second NLP model, wherein the first model configuration data or the second model configuration data is usable to:
1) Define a preprocessing pipeline that includes a subset of the preprocessing modules; and
2) indicate one or more software toolkits or libraries usable to implement each of the preprocessing modules;
receiving, via an online computing environment that is different than the offline computing environment, a first request to process first data using the first NLP model and receiving a second request to process second data using the second NLP model;
accessing the first model configuration data and the second model configuration data;
responsive to the first request, executing the first NLP model at least in part by determining, based on the first model configuration data, a first set of preprocessing modules from the preprocessing modules to preprocess the first data; and
responsive to the second request, executing the second NLP model at least in part by determining, based on the second model configuration data, a second set of preprocessing modules from the preprocessing modules to preprocess the second data, the second set of preprocessing modules different than the first set of preprocessing modules.

2. The system of claim 1, wherein the first set of preprocessing modules are implemented using the one or more software toolkits or libraries of a first computer programming language of the plurality of computer programming languages, and the second set of preprocessing modules are implemented using the one or more software toolkits or libraries of a second computer programming language of the plurality of computer programming languages that is different than the first computer programming language.

3. The system of claim 1, wherein the first set of preprocessing modules and the second set of preprocessing modules are different subsets of the preprocessing modules, the preprocessing modules comprising at least one of a language detection module, a sentence detection module, a tokenization module, a cleaning module, an annotation module, a normalization module, or an embedding module.

4. The system of claim 1, wherein the preprocessing pipeline includes a first preprocessing pipeline and a second preprocessing pipeline, wherein the first model configuration data defines the first preprocessing pipeline that specifies a first execution sequence of the first set of preprocessing modules, and the second model configuration data defines the second preprocessing pipeline that specifies a second execution sequence of the second set of preprocessing modules.

5. The system of claim 4, wherein the first set of preprocessing modules includes the same modules as the second set of preprocessing modules, and wherein the first execution sequence is different from the second execution sequence.

6. The system of claim 1, wherein the executing the first set of preprocessing modules for the first NLP model further comprises inputting the first model configuration data into a software engine that is programmed in the domain specific language.

7. The system of claim 6, wherein the operations further comprise:
automatically validating, by the software engine programmed in the domain specific language, the first set of preprocessing modules with sample data.

8. The system of claim 1, wherein the online computing environment comprises at least one different computing characteristic than the offline computing environment, the at least one different computing characteristic including at least one of different computer hardware, a different operating system, a different software version for one or more software libraries, a different database topography, or access to different data.

9. The system of claim 1, wherein the operations further comprise:
training the first NLP model and the second NLP model in the offline computing environment.

10. A method, comprising:
receiving, via a first computing environment, a request to process text data using a first natural language processing (NLP) model;
accessing configuration data associated with the NLP model, the configuration data generated using a domain specific language that supports a plurality of preprocessing modules in a plurality of computer programming languages, wherein the domain specific language provides a uniform description of the plurality of computer programming languages, wherein the configuration data indicates one or more of the plurality of preprocessing modules to be included as a part of a preprocessing pipeline, and one or more specific software toolkits or libraries associated with a first computer programming language of the plurality of computer programming languages usable to generate the preprocessing pipeline;
generating, based on the configuration data, the preprocessing pipeline using the one or more of the plurality of preprocessing modules;
generating preprocessed text data at least in part by inputting the text data into the preprocessing pipeline; and
providing the preprocessed text data to the first NLP model.

11. The method of claim 10, wherein the preprocessing pipeline defines a sequence of the one or more of the plurality of preprocessing modules.

12. The method of claim 10, wherein the one or more of the plurality of preprocessing modules comprise at least one of a language detection module, a sentence detection module, a tokenization module, a cleaning module, an annotation module, a normalization module, or an embedding module.

13. The method of claim 10, wherein the configuration data is generated in a second computing environment that is different from the first computing environment.

14. The method of claim 13, wherein at least one of the first computing environment or the second computing environment includes a processing engine configured to process the configuration data in the domain specific language.

15. The method of claim 10, wherein the preprocessing pipeline comprises a first preprocessing pipeline, and wherein the method further comprises:

generating a second preprocessing pipeline for a second NLP model based on second configuration data, the second preprocessing pipeline including a different set of the one or more preprocessing modules that are programmed in a second computer programming language of the plurality of computer programming languages, wherein the second preprocessing pipeline includes at least one different type of preprocessing module than the first preprocessing pipeline.

16. The method of claim 15, wherein the domain specific language provides a uniform way to describe or designate the one or more specific software toolkits or libraries usable to generate the preprocessing pipeline.

17. A non-transitory computer readable medium storing computer-executable instructions that in response to execution by one or more hardware processors, causes a service provider system to perform operations comprising:

receiving, via a first computing environment, a request to process text data using a first natural language processing (NLP) model;

accessing configuration data associated with the NLP model, the configuration data generated using a domain specific language that provides a uniform description of a plurality of computer programming languages, wherein the plurality of computing programming languages are usable to create a plurality of preprocessing modules, wherein the configuration data indicates one or more of the plurality of preprocessing modules to be included as a part of a preprocessing pipeline, and one or more specific software toolkits or libraries associated with a first computer programming language of the plurality of computer programming languages usable to generate the preprocessing pipeline;

selecting, based on the configuration data, one or more preprocessing modules of the plurality of preprocessing modules, the one or more preprocessing modules programmed in a first computer programming language of the plurality of computer programming languages;

generating, based on the configuration data, the preprocessing pipeline using the one or more selected preprocessing modules;

generating preprocessed text data by inputting the text data into the preprocessing pipeline; and providing the preprocessed text data to the first NLP model.

18. The non-transitory computer readable medium of claim 17, wherein the one or more preprocessing modules comprise at least one of a language detection module, a sentence detection module, a tokenization module, a cleaning module, an annotation module, a normalization module, or an embedding module.

19. The non-transitory computer readable medium of claim 17, wherein the preprocessing pipeline is a first preprocessing pipeline, and wherein the operations further comprise:

generating a second preprocessing pipeline for a second NLP model based on second configuration data, the second preprocessing pipeline including one or more preprocessing modules that are programmed in a second computer programming language of the plurality of computer programming languages.

20. The non-transitory computer readable medium of claim 17, wherein the configuration data is generated in a second computing environment that is different from the first computing environment.

* * * * *